United States Patent [19]
Chancellor

[11] Patent Number: 5,649,771
[45] Date of Patent: Jul. 22, 1997

[54] DOUBLE FACED SPEED REGULATED MECHANICAL SEAL

[76] Inventor: Dennis H. Chancellor, Poway P.O., 13308 Midland Rd., Poway, Calif. 92064

[21] Appl. No.: 247,232

[22] Filed: May 23, 1994

[51] Int. Cl.$^6$ .................................................. F16C 33/38
[52] U.S. Cl. ............................................ 384/481; 384/523
[58] Field of Search ...................................... 384/481, 489, 384/531, 523, 477

[56] References Cited

U.S. PATENT DOCUMENTS

| | | | |
|---|---|---|---|
| 3,365,251 | 1/1968 | Venable | 384/481 |
| 3,743,369 | 7/1973 | Langstrom | |
| 3,838,901 | 10/1974 | Sampatacos | 384/481 |
| 5,069,560 | 12/1991 | Niedermeier | 384/486 |

Primary Examiner—Lenard A. Footland

[57] ABSTRACT

This invention discloses a roller or ball bearing assembly, a bearing finger cage and a mechanically interlocked double faced speed regulated mechanical seal arrangement. The selection of the radius of the rolling bearing diameters determines the rotational speed of the driven bearing finger cage and the rotational speed of the bearing finger cage assures the mechanical and rotational speed of the speed regulated mechanical seal wherein the relative speeds of the plurality of sealing faces are reduced proportionally by the division of applied shaft speed revolutions among the plurality of seal finished face members. The reduced relative surface speeds of sealing face members will increase the overall service life of the unique speed regulated mechanical seal and bearing assembly. The reduced relative surface speeds of sealing face members will allow greater applied shaft rotational speed than present art mechanical seals.

1 Claim, 7 Drawing Sheets

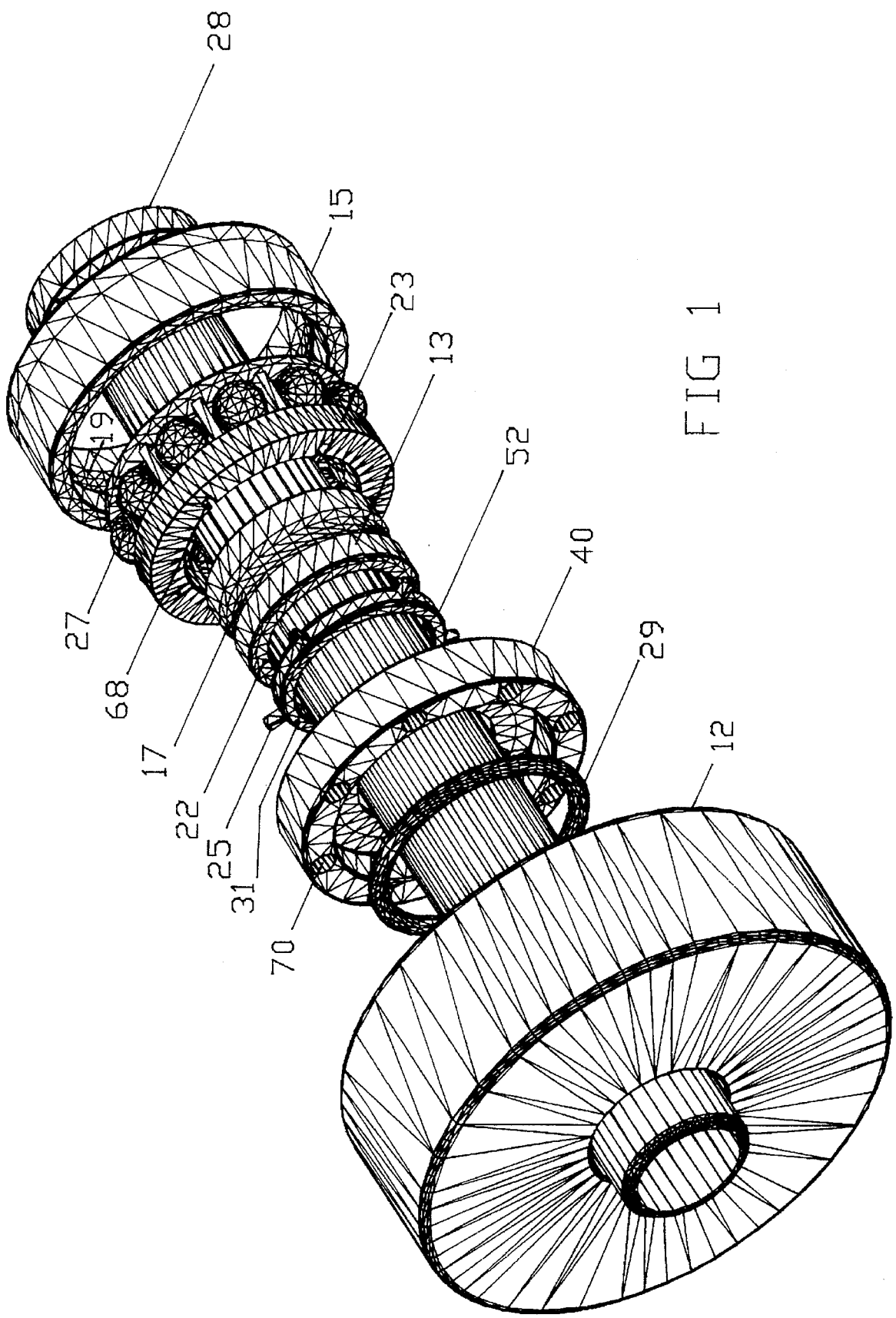

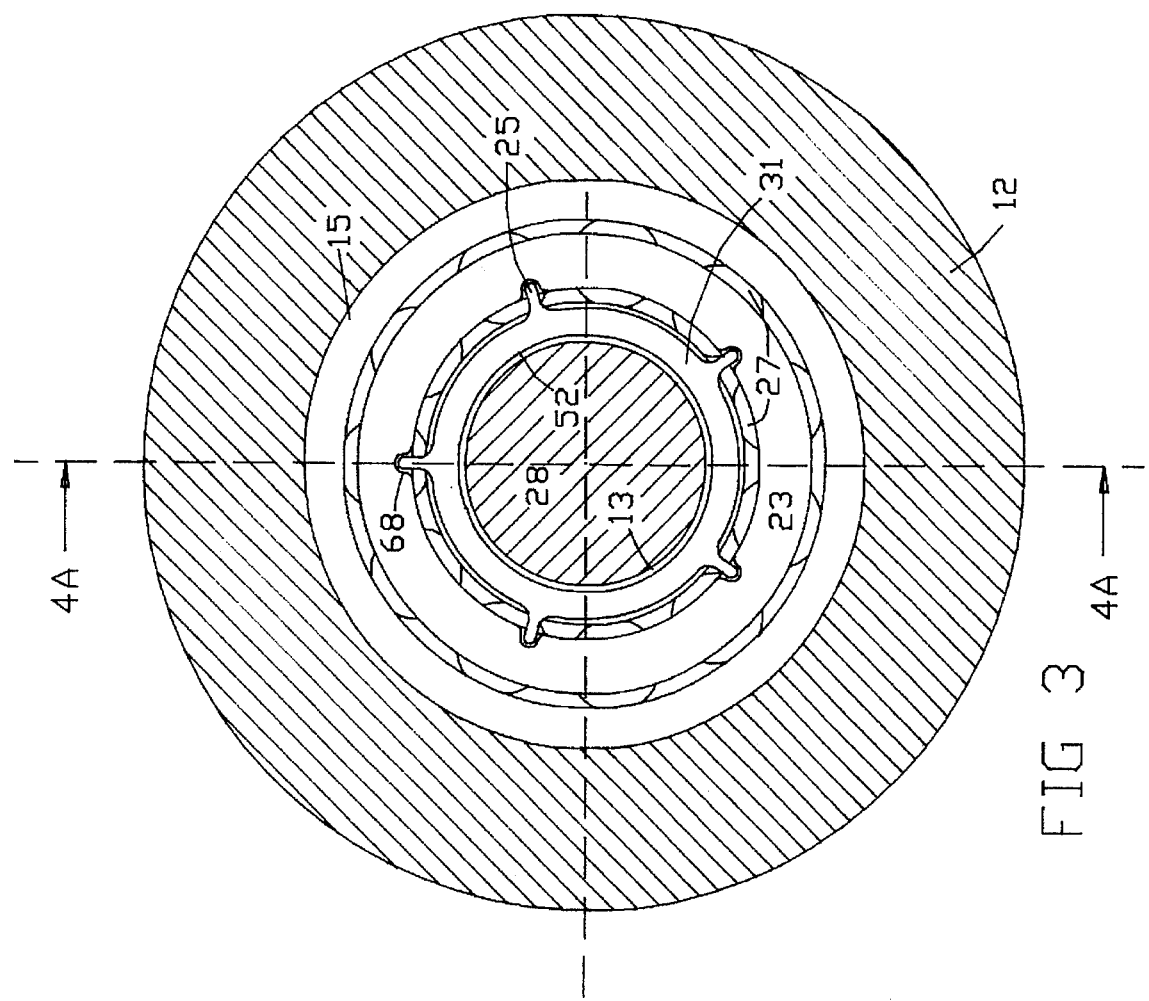
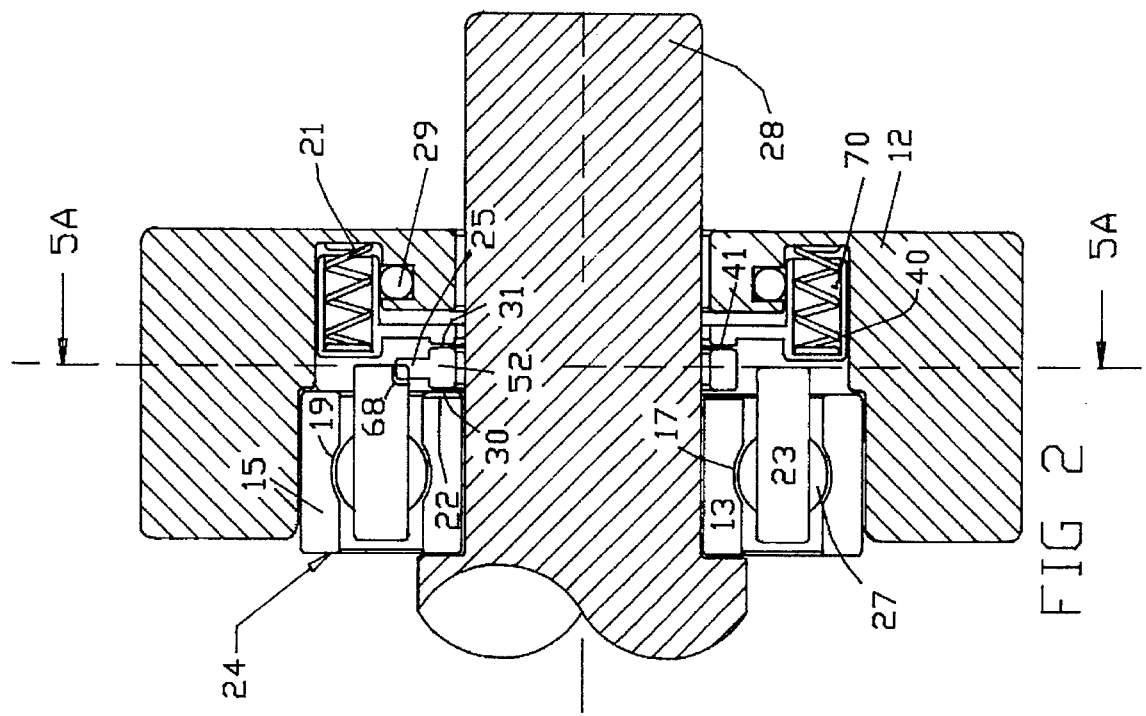
FIG 3
FIG 2

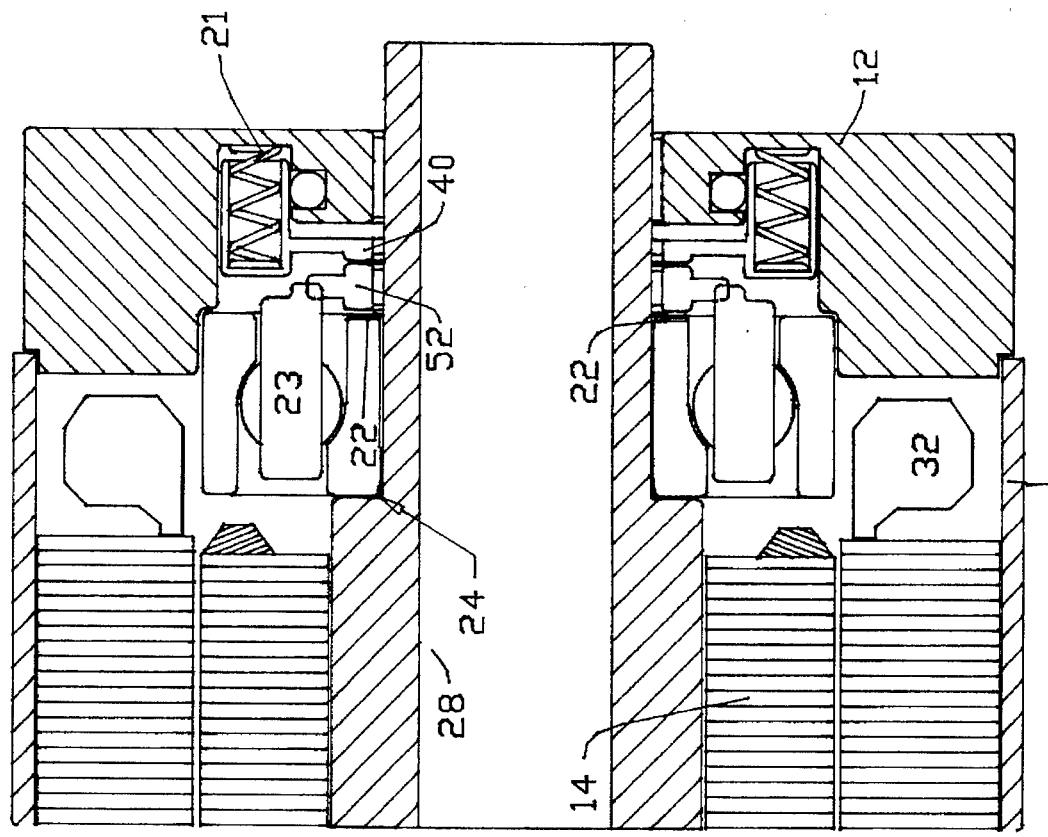

5,649,771

DOUBLE FACED SPEED REGULATED MECHANICAL SEAL

BACKGROUND OF THE INVENTION

1. Field of the Invention

The invention relates to a combination of bearings and mechanical seals. The instant invention where a double faced speed regulated mechanical seal is speed assured by a plurality of digits or protuberances engaging the reduced speed bearing alignment finger cage. The speed regulated mechanical seal is otherwise mechanically and rotationally interconnected with the bearing alignment finger cage. Mechanical sealing pressure on the sealing surfaces is exerted by a wave spring, a compression spring, a bellows spring or a plurality of compression springs and or a combination of such mechanical devices. Mechanical sealing pressure may also be assisted or adjusted by an variable hydraulic or pneumatic pressure source injected between the non-rotating mechanical seal and the endplate or other supporting structure. Said non-rotating mechanical moves slightly linear with the axis of rotation of the shaft. Said seal is slip fit into a groove in said endplate or other supporting structure. The outmost perpendicular axial surface of the inmost shaft speed bearing race may also be utilized and finished as a mechanical seal finished face or a shaft speed seal finished face ring may be employed.

2. Description of the Related Art

U.S. Pat. No. 5,069,560 issued to Rudolph Niedermeier et al December 1991 describes a ball bearing cage having on its opposite axial ends a seal member with radial outward projection dovetailing into an annular groove defined in the raceway of the respective inner and outer rings. Each projection having a sealing lip at its end bearing laterally or a lateral surface of the annular groove.

U.S. Pat. No. 3,743,369 issued to Langstrom in 1971 describes cages of synthetic resins for rolling bearings comprising an annular directed ridge is arranged between any two pockets integral with the annular and the collars defining said pockets which include two chambers for a lubricant adjacent to each pocket.

The related art examined did not disclose the improvements of the instant invention.

SUMMARY OF THE INVENTION

An object of the instant invention is to provide a unique long service speed regulated mechanical seal and bearing arrangement. An arrangement wherein the relative speeds of the plurality of sealing faces are reduced proportionally by the division of applied shaft speed revolutions among the plurality of seal finished face members. The reduced relative surface speeds of the sealing face members will increase the overall service life of the unique speed regulated mechanical seal and bearing assembly.

A further object of the instant invention is that the speed regulated mechanical seal and bearing assembly will also allow higher applied shaft speeds then present art seal assemblies may withstand.

A further object of the instant invention is that the speed regulated mechanical seal and bearing assembly will also allow larger diameter shaft and bearing assembles then the present art seal assemblies.

The speed regulated mechanical seal is mechanically and rotationally interconnected with the bearing finger cage. Said speed regulated mechanical seal will rotate at approximately half the speed of the shaft to which the inside bearing race is press fitted. Said speed regulated mechanical seal, with a first seal finished face being pressed by a linear motion non-rotating mechanical seal and seal finished face that does not rotate. The shaft speed bearing race and seal finished face is machined and press fit to a press fit standard or otherwise affixed to the rotating shaft. Said speed regulated mechanical seal will move in an slight axial or linear direction with a second seal finished face pressing against the said shaft speed bearing race seal finished face or a separate shaft speed sealing ring with a seal finished face. The non-rotating mechanical seal is sealed in the linear slide or axial direction by a stationary sealing ring or rings. The stationary bearing race is machined and press fit into the stationary endplate otherwise affixed to the endplate. The instant invention may be used in motors, pumps, compressors, or hydraulic assemblies. The instant invention may be used in diesel engines or conventional fueled engines, turbines or aerospace engines and pumps. The instant invention may be used in marine and sub marine engines, propulsion and drive units or pumps. The instant invention may be assembled in sizes from sub miniature to very large diameter mechanical seals and bearing arrangements.

BRIEF DESCRIPTION OF THE DRAWINGS

FIG. 1 is a perspective view of the speed regulated mechanical seal.

FIG. 2 is a sectional view through 4A of FIG. 3.

FIG. 3 is a sectional view through 5A of FIG. 2.

FIG. 8 is a hollow shaft speed regulated mechanical seal.

DETAILED DESCRIPTION OF THE PREFERRED EMBODIMENTS

Figure 5:
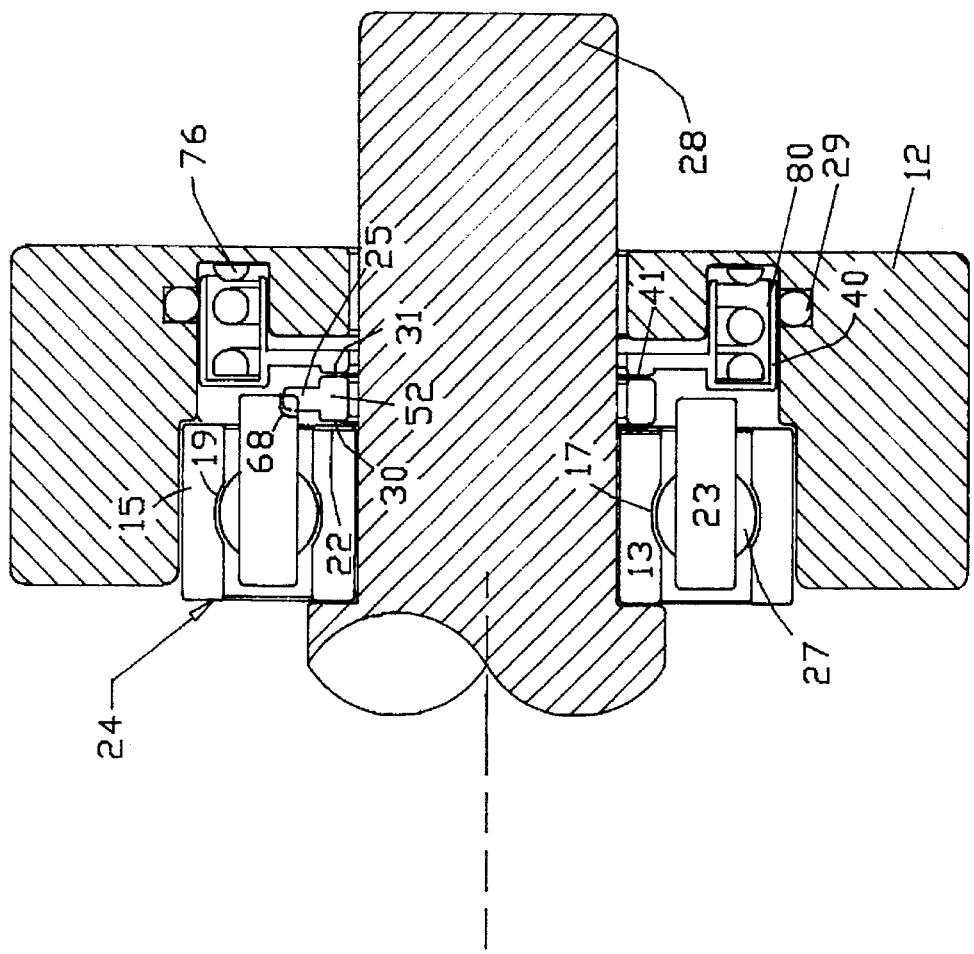
FIG. 5 is a coil spring detail of the mechanical seal.

FIG. 1 is a perspective view of the double faced speed regulated mechanical seal and bearing assembly. Inside stationary endplate 12 is a seal ring groove seat for seal ring 29. Said seal ring 29 is the axial slide motion seal for non-rotating mechanical seal 40. Compression spring sockets 70 are recessed in said seal 40. Seal finished face 31 of double faced speed regulated mechanical seal 52 is pressed to mechanical sealing pressure exerted by the axial slide motion of said seal 40. Mechanical digits 25 of said seal 52 engage mechanical driver receptors 68 of bearing finger cage 23. Said seal 52 presses at mechanical sealing pressure on the seal finished face of shaft speed seal ring 22 of inmost shaft speed bearing race 13. Said race 13 has annular raceway 17. Raceway 17 guides a plurality of roller bearings or ball bearings 27. Said bearings 27 are kept aligned and evenly spaced by bearing finger cage 23. The rotational speed of said cage 23 and mechanically interconnected seal 52 is consummate with the center of axis of rotation of bearings 27 as they are driven to rotate around shaft speed shaft 28. Said bearings 27 roll in raceway 19 of stationary outmost bearing race 15.

FIG. 2 is a view taken along the line 4A of FIG. 3. A bearing assembly 24 is shown mounted between rotating shaft 28 and stationary endplate 12. Races 13 and 15 are provided with annular raceways 17 and 19, respectfully. A plurality of rollers or ball bearings 27 are located in raceways 17 and 19 of said bearing assembly 24. Said bearings 27 are kept evenly spaced by bearing finger cage 23. Said finger cage 23 is mechanically driven at speeds consummate with the center axis of rotation of rolling bearings 27 within bearing assembly 24. Said cage 23, having mechanical driver receptors 68, is engaged by a plurality of protuberances or mechanical digits 25. Said digits 25 radiating from double faced speed regulated mechanical seal 52. Said speed regulated mechanical seal 52 is mechanically and rotationally interconnected with bearing cage 23. Said seal 52 rotates at rotational speeds perfect with cage 23. Said mechanical seal 52 being retained radially by mechanically engaging cage 23. Said mechanical seal 52 is retained axially on a first side of seal finished face 31 by axial motion non-rotating mechanical seal 40. Said seal 40 with non-rotating seal finished face 41 in contact with speed regulated seal finished face 31. Said seal 52 is retained axially on a second side with seal finished face 30 by seal finished face shaft speed seal ring 22. Said seal 40 moves axially by a plurality of compression springs 21 and exerts mechanical seal pressure on seal 52. Said springs 21 are seated against stationary endplate 12. Said springs 21 are retained in spring sockets 70 of said seal 40. Said seal 52 is moved axially or linear and exerts mechanical sealing drive pressure on shaft speed seal face ring 22 by the linear compression movement of seal 40. Endplate 12 encompasses sealing ring 29 to seal said seal 40 in linear motion.

FIG. 3 is a view taken along line 5A of FIG. 2. Stationary outmost bearing race 15 is seated in endplate 12. Roller or ball bearings 27 roll between said race 15 and inmost bearing race 13. Said inmost race 13 is affixed to, and rotates at shaft speed of shaft 28. Roller or ball bearings 27 are evenly spaced and kept apart by finger cage 23. Cage 23 is driven by bearings 27 and rotates in the same direction as shaft 28. Cage 23 rotates around the center of axis of shaft 28 but at the center of axis speed of bearings 27. Double faced speed regulated mechanical seal 52 is mechanically connected to cage 23 and said seal 52 rotates at exactly the same speed as cage 23. Seal finished face 31 of seal 52 may be seen in FIG. 3. Mechanical digits 25 of seal 52 may be seen engaging said receptors 68 of cage 23 in FIG. 3.

Figure 4:
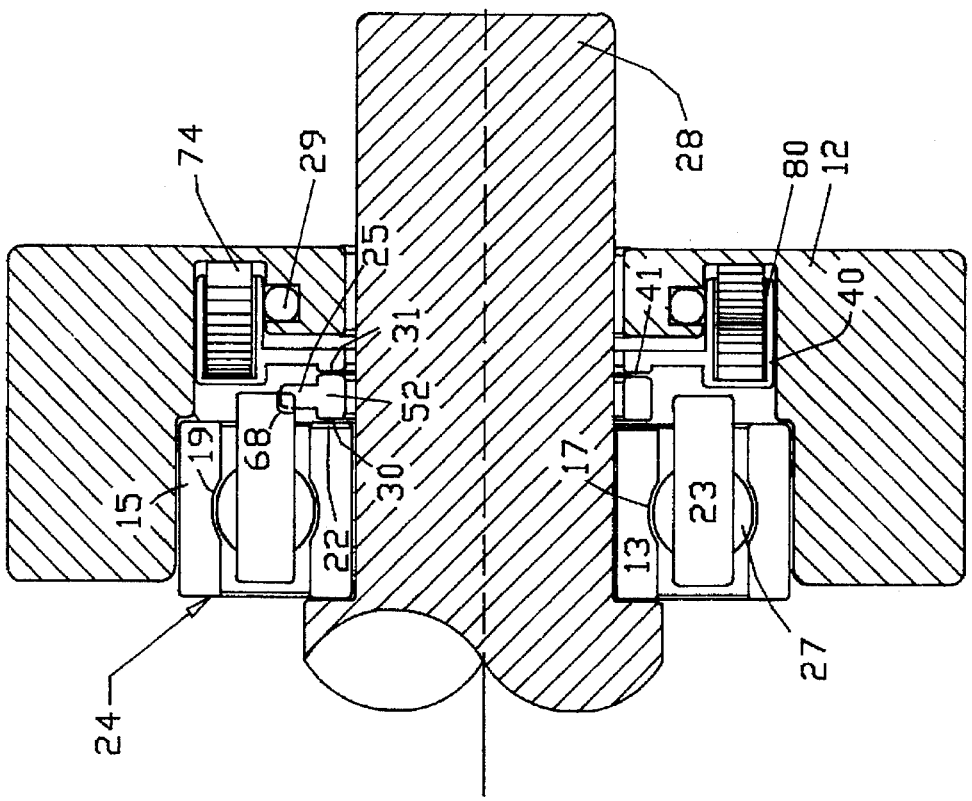
FIG. 4 is a wave spring detail of the mechanical seal.

FIG. 4 is a wave spring detail of the speed regulated mechanical seal. Most of this embodiment parts are identified in FIG. 2. An alternate embodiment of the invention can be seen in FIG. 4. Wherein wave spring 74 has replaced the plurality of compression springs 21 described in FIG. 2. Said spring 74 would be recessed in spring groove 80 of seal 40. Said groove 80 has replaced spring sockets 70.

FIG. 5 is a coil spring detail of the speed regulated mechanical seal. Most of this embodiment parts are identified in FIG. 2. An alternate embodiment of the invention can be seen in FIG. 5. Wherein coil spring 76 has replaced the plurality of compression springs 21 described in FIG. 2. Said spring 76 would be recessed in spring groove 80 of seal 40. Also the hydraulic assist surface is expanded to include additional seal back surface inside said spring groove 80.

Figure 6:
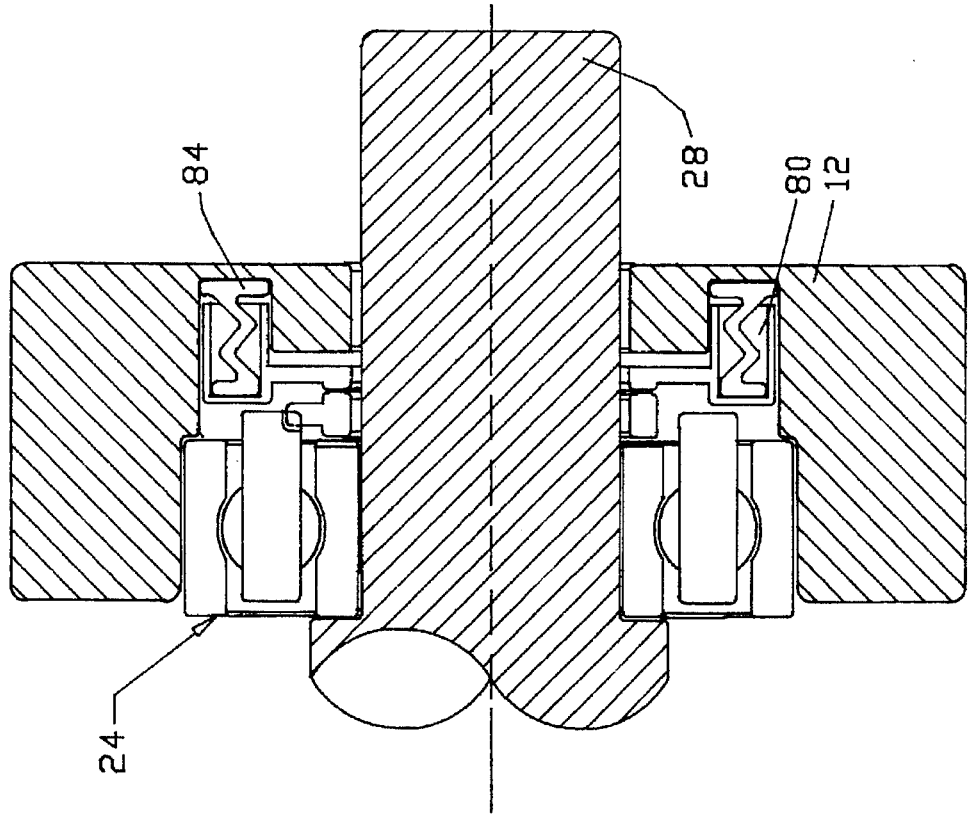
FIG. 6 is a bellows action detail of the mechanical seal.

FIG. 6 is a bellows spring action detail of the speed regulated mechanical seal. Most of this embodiment parts are identified in FIG. 2. An alternate embodiment of the invention can be seen in FIG. 6. Wherein bellows spring 84 has replaced the plurality of compression springs 21 described in FIG. 2. Said spring 84 would be recessed in spring groove 80 of non-rotating mechanical seal 40.

Figure 7:
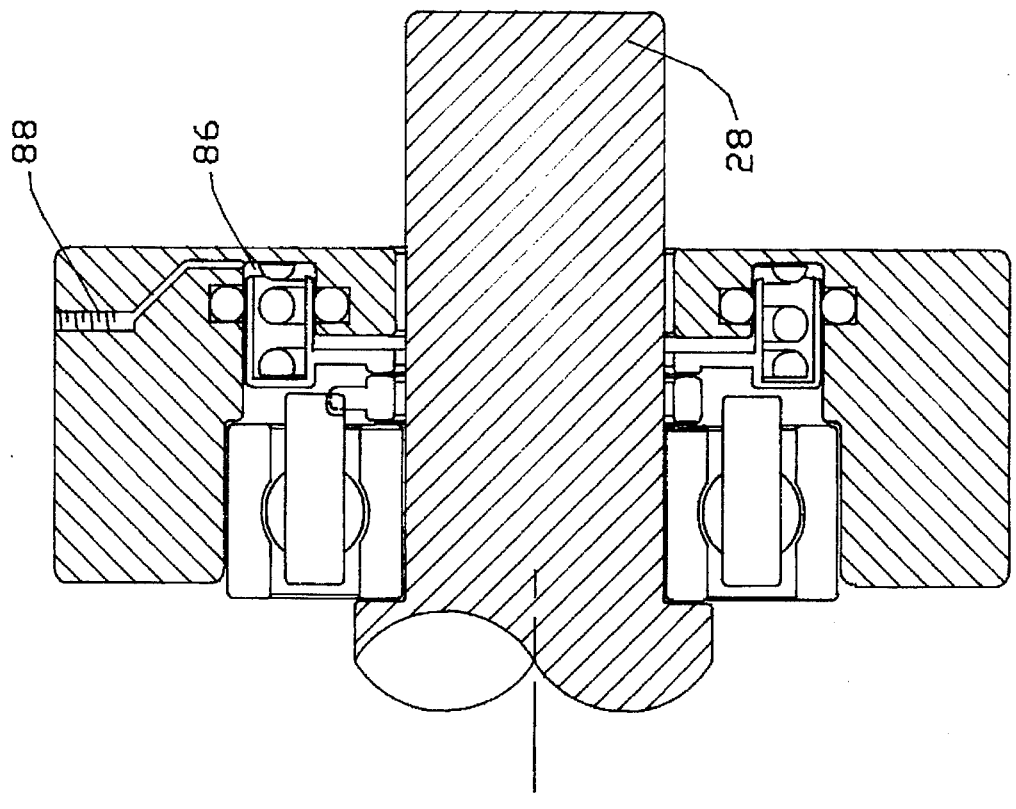
FIG. 7 is a pressure assisted or sealing pressure compensated mechanical seal.

FIG. 7 is a pressure assisted detail of the speed regulated mechanical seal. Most of this embodiment parts are identified in FIG. 2. An alternate embodiment of the invention can be seen in FIG. 7. Wherein the pressure exerted by seal 40 is made variable by an outside control mechanism depending upon conditions or application. The pressure assist channel 88 from said outside control mechanism is shown in FIG. 7. Said pressure assist channel 88 and pressure injection or relief port 86 allows pressure to be varied between said endplate and said non-rotating mechanical seal 40.

FIG. 8 is a hollow shaft detail of the speed regulated mechanical seal. Most of this embodiment parts are identified in FIG. 2. An alternate embodiment of the invention can be seen in FIG. 8. Wherein said shaft 28 is hollow. Also shown is motor rotor 14 attached to said shaft 28. Motor stator 32 is shown attached to motor housing 10. Said motor housing 10 is stationary and attached to endplate 12. Compression springs 21 described in FIG. 2 are also shown.

Figure 9:
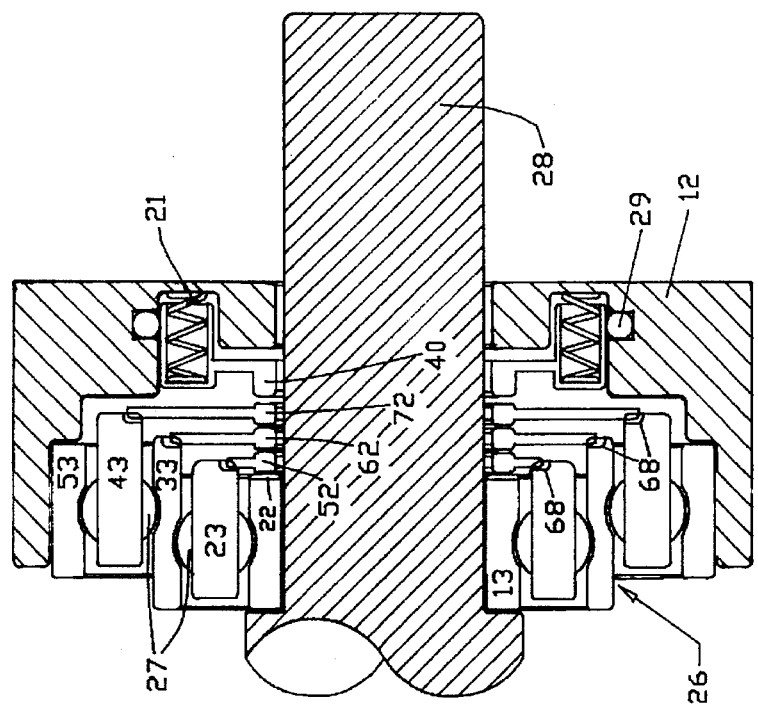
FIG. 9 is a multi speed mechanical seal and multi level bearing assembly.

FIG. 9 is a multispeed speed regulated mechanical seal. Many of this embodiment parts may be identified in FIG. 2. An alternate embodiment of the invention can be seen in FIG. 9. Wherein double bearing assembly 26 has the inmost race 13 secured to shaft 28 and the outmost race secured to stationary endplate 12. The double raced center race 33 separates two layers of roller or ball bearings 27. Each layer of bearings 27 may be made the same size or a different size for each layer depending upon the speeds desired for each double seal faced speed regulated mechanical seal 52,62 or 72. Speed regulated mechanical seal 52 is mechanically and rotationally connected to driven bearing cage 23. Speed regulated mechanical seal 72 is mechanically and rotationally connected to driven bearing cage 43. Speed regulated mechanical seal 62 is mechanically and rotationally connected to said center race 33. Non rotating mechanical seal 40 assures sealing pressure on said seal 72. Said seal 72 assures sealing pressure on said seal 62. Said seal 62 assures sealing pressure on said seal 52. Said seal 52 assures sealing pressure on shaft speed seal ring 22. All speed regulated mechanical seals would be double lap faced finished.

Figure 10:
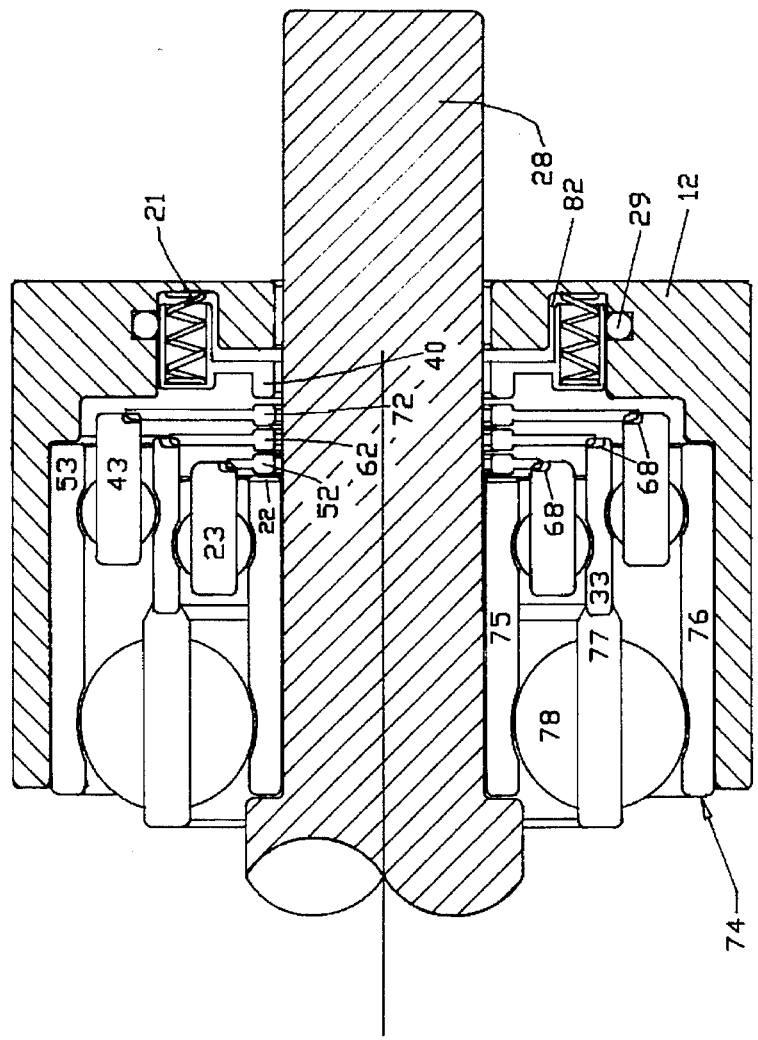
FIG. 10 is a multi speed assured heavy duty bearing assembly and combination mechanical seal and multi level bearing assembly.

FIG. 10 is a complex multispeed speed regulated mechanical seal. Most of this embodiment's parts are identified in FIG. 2 and in FIG. 9. An alternate embodiment of the invention can be seen in FIG. 10. Wherein complex bearing assembly 74 has the inmost race 75 secured to shaft 28 and the outmost race 76 secured to stationary endplate 12. The double raced center race 33 is speed regulated by bearing finger cage 77. Said cage 77 of bearing assembly 74 is speed assured and driven by roller or ball bearings 78. Said center race 33 separates two layers of roller bearings 27 of the same size or a different size for each layer. Speed regulated mechanical seal 52 is mechanically and rotationally connected to driven bearing cage 23. Speed regulated mechanical seal 72 is mechanically and rotationally connected to driven bearing cage 43. Speed regulated mechanical seal 62 is mechanically and rotationally connected to said center race 33. Non-rotating mechanical seal 40 assures sealing pressure on said seal 72. Said seal 72 assures sealing pressure on said seal 62. Said seal 62 assures sealing pressure on said seal 52. Said seal 52 assures sealing pressure on shaft speed seal ring 22. All speed regulated mechanical seals would be double lap faced finished.

Figure 11:
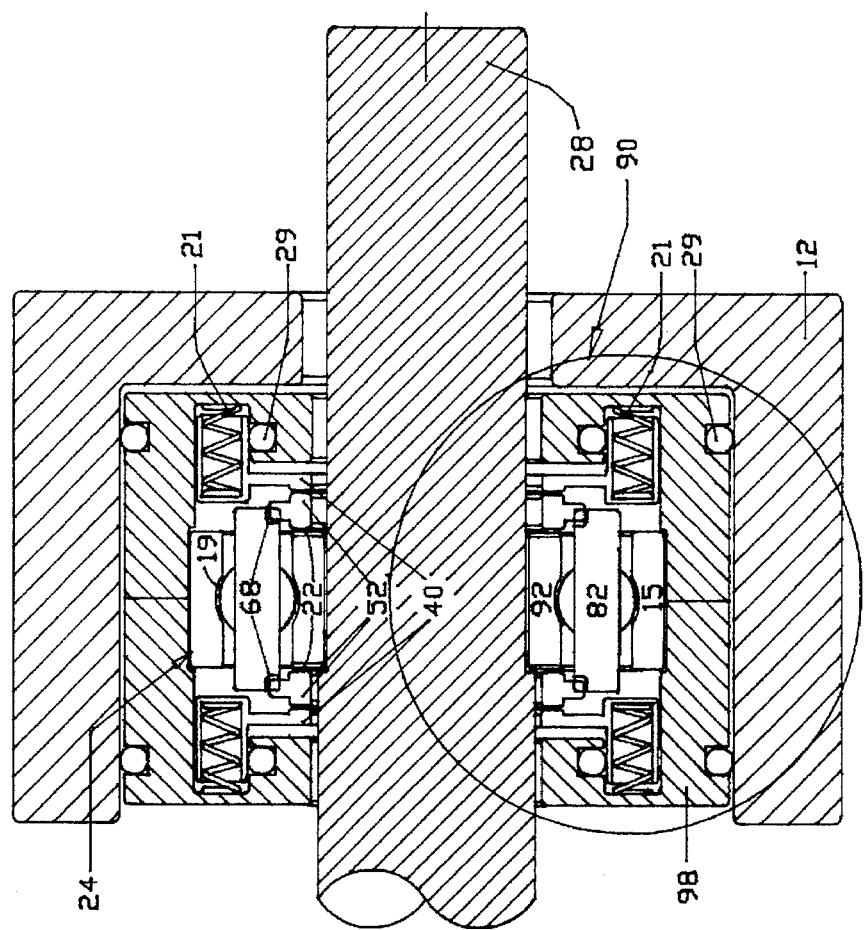
FIG. 11 is a double sided speed regulated mechanical seal and bearing assembly.

FIG. 11 is a double ended speed regulated mechanical seal. Many of the parts of this embodiment are identified in FIG. 2. An alternate embodiment of the invention can be seen in FIG. 11. Wherein a modular combination bearing and speed regulated mechanical seal assembly 90 is double sided. A double sided assembly would allow race 92 to be seal finished on the internal and external axial faces as in shaft speed seal ring 22. Bearing cage 82 has a plurality of mechanical driver receptors 68 on the internal and external axial faces. Two speed regulated mechanical seals 52 engage said cage 82 with a plurality of mechanical digits 25 on the internal and external sides of said cage 82. Sealing pressure is exerted by opposing non-rotating mechanical seals 40. Springs 21 exert the sealing pressure on said seal 40. Springs 21 are seated against modular housing assembly 98. Modular assembly 90 of FIG. 11 may be recessed into endplate 12 or machined into and included as part of endplate 12.

Figure 12:
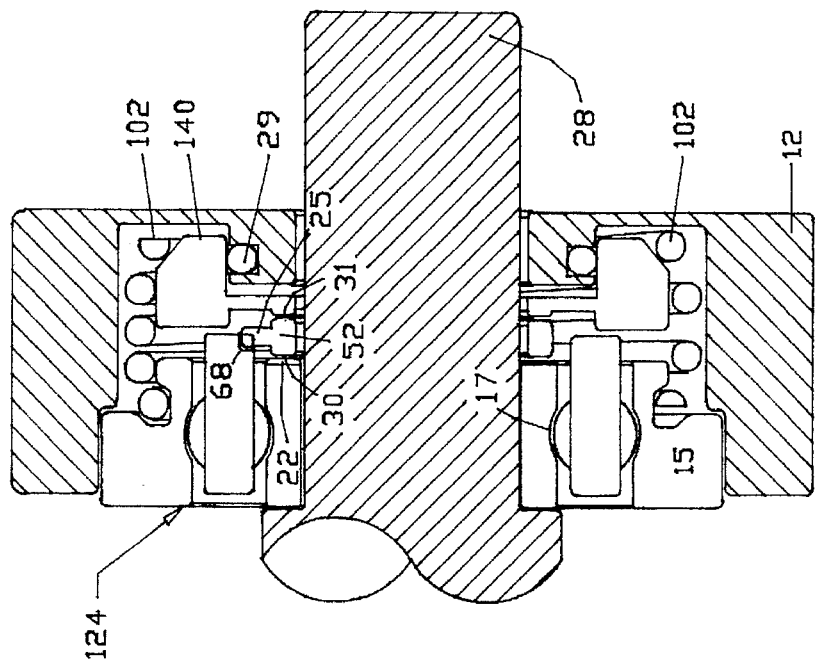
FIG. 12 is a extension spring speed regulated mechanical seal and bearing assembly.

FIG. 12 is a wave spring detail of the speed regulated mechanical seal. Most of this embodiment parts are identified in FIG. 2. An alternate embodiment of the invention can be seen in FIG. 12. Wherein extension spring 102 has replaced the plurality of compression springs 21 described in FIG. 2. Said spring 102 would be secured on one end to stationary outmost bearing race 15. Said race 15 is seated in endplate 12. Said spring 102 would be extended and secured on the other end to stationary non-rotating mechanical seal 140. Unique bearing assembly 124 may be seen in FIG. 12.

I claim:

1. A roller or ball bearing assembly with the bearings equally spaced between fixed and rotating race members having a bearing finger cage separating the bearings and said finger cage provides for a plurality of equally spaced mechanical driver receptors to be engaged by equally spaced matching protuberances or mechanical digits on the circumference of a double faced speed regulated mechanical seal wherein the improvements comprise:

(a), the rotational speed of the bearing finger cage being directly related to the mean radius and the center of axis of rotation of roller or ball bearings;

(b), the rotational speed of the double faced speed regulated mechanical seal is assured by said mechanical digits mechanically interlocking said mechanical driver receptors of said bearing finger cage;

(c), a combination shaft speed mechanical seal finished face and shaft speed bearing race;

(d), said double faced speed regulated mechanical seal being ring shaped rotating around the center axis of rotation of the shaft with a seal finished face on each side mechanically and rotationally connected to said driven bearing cage;

(e), the relative speeds of the plurality of sealing faces are reduced proportionally by the division of applied shaft speed revolutions among the plurality of sealing faces;

(f), said speed regulated mechanical seal having a seal finished face on a first side compressing with sealing pressure against the said seal finished face of the shaft speed mechanical seal finished face;

(g), the inmost bearing race rotates at shaft speed of shaft;

(h), said speed regulated mechanical seal having a seal finished face on a second side being compressed with sealing pressure by the seal finished face of a circular but not rotating mechanical seal with a slight axial movement and;

(i), said non-rotating mechanical seal held in compression sealing contact with the speed regulated mechanical seal by means of a plurality of compression springs seated in spring sockets and compressed against a endplate or other supporting structure into which said non-rotating mechanical seal is slip fitted.

* * * * *